US012808707B2

(12) United States Patent
Folnsbee

(10) Patent No.: US 12,808,707 B2
(45) Date of Patent: Nov. 24, 2026

(54) ROLL WEIGHT SYSTEM FOR ON MACHINE DYNAMIC VERIFICATION

(71) Applicant: Honeywell International Inc., Charlotte, NC (US)

(72) Inventor: Eric J. Folnsbee, Winterport, ME (US)

(73) Assignee: Honeywell International Inc., Charlotte, NC (US)

( * ) Notice: Subject to any disclaimer, the term of this patent is extended or adjusted under 35 U.S.C. 154(b) by 556 days.

(21) Appl. No.: 18/221,156

(22) Filed: Jul. 12, 2023

(65) Prior Publication Data

US 2025/0020502 A1 Jan. 16, 2025

(51) Int. Cl.

| | |
|---|---|
| ***G01G 17/02*** | (2006.01) |
| ***B21B 1/22*** | (2006.01) |
| ***B65H 18/08*** | (2006.01) |
| ***B65H 20/02*** | (2006.01) |
| ***D21F 9/02*** | (2006.01) |
| ***D21G 9/00*** | (2006.01) |

(52) U.S. Cl.

CPC ............... *G01G 17/02* (2013.01); *B21B 1/22* (2013.01); *B65H 18/08* (2013.01); *B65H 20/02* (2013.01); *D21F 9/02* (2013.01); *D21G 9/0009* (2013.01); *B65H 2801/84* (2013.01)

(58) Field of Classification Search

CPC ...................................................... G01G 17/02
USPC .......................................................... 162/118
See application file for complete search history.

(56) References Cited

U.S. PATENT DOCUMENTS 4,678,915 A 7/1987 Dahlquist
4,767,935 A 8/1988 Anderson
5,370,327 A 12/1994 Adamksi
5,917,159 A 6/1999 Kostiuk
6,089,498 A * 7/2000 Sticht .................... H01F 41/096 242/563
6,967,726 B2 11/2005 King
7,845,592 B2 12/2010 Gustavsson
(Continued)

FOREIGN PATENT DOCUMENTS

CN 103616497 B2 10/2015
JP 6667429 B2 3/2020

OTHER PUBLICATIONS

S.Nagata et al., Development of New BM Sensor System without Radiation, Japan TAPPI Journal vol. 70, No. 9, pp. 57-65 Sep. 2016.

*Primary Examiner* — Jacob T Minskey
(74) *Attorney, Agent, or Firm* — Alston & Bird LLP

(57) ABSTRACT

Wireless technique of measuring the gross weight of sheet material on a finished reel spool generates real time weight readings. An apparatus for determining the gross weight of sheet material on a roll includes: a spool that is equipped with an RFID tag to identify its tare weight and/or its spool identification number wherein the spool is configured to wind the sheet of material; means for lifting a roll of material that is wound on the spool and comprises a sensor configured to sense a force produced by the roll of material when lifted and transmitting wireless signals that include information representative of the force produced by the roll; and means for calculating the gross weight of the sheet of material wound on the roll. The actual weight measurements achieve fast dynamic correlations to the online weight measurements. Operating parameters of actuators and sensors can be adjusted following verification.

8 Claims, 4 Drawing Sheets

(56) References Cited

U.S. PATENT DOCUMENTS

| | | | | |
|---|---|---|---|---|
| 10,935,368 | B2 | 3/2021 | Tixier | |
| 11,688,926 | B2 | 6/2023 | Vogt | |
| 2006/0055531 | A1 | 3/2006 | Cook | |
| 2008/0105059 | A1 | 5/2008 | Turnbull | |
| 2014/0027511 | A1 | 1/2014 | Plocher | |
| 2015/0022220 | A1 | 1/2015 | Tixier | |
| 2018/0266913 | A1 | 9/2018 | Rahman | |
| 2021/0320813 | A1 | 10/2021 | Balraj | |
| 2022/0258271 | A1* | 8/2022 | Christopher ......... | B23K 9/1336 |
| 2023/0113646 | A1 | 4/2023 | Battle | |

* cited by examiner

ROLL WEIGHT SYSTEM FOR ON MACHINE DYNAMIC VERIFICATION

FIELD OF THE INVENTION

The present invention generally relates to quality control techniques for fabricating sheet materials and, more particularly, to systems for measuring the actual gross weight of a roll immediately after its production in a sheet making facility. The weight data allows dynamic verification of the accuracy of on-line basis weight measurements so that adjustments to the operating conditions of the sheetmaking process can be made.

BACKGROUND OF THE INVENTION

On-line measurements are used to detect properties of sheet materials during manufacture to enable prompt control of the sheetmaking processes and, thus, to assure sheet quality while reducing the quantity of substandard sheet material which is produced.

In the manufacture of paper on continuous papermaking machines, a web of paper is formed from an aqueous suspension of fibers (stock) on a traveling mesh papermaking fabric and water drains by gravity and suction through the fabric. The web is then transferred to the pressing section where more water is removed by pressure and vacuum. The web next enters the dryer section where steam heated dryers and hot air completes the drying process. The paper machine is, in essence, a water removal system. A typical forming section of a papermaking machine includes an endless traveling papermaking fabric or wire, which travels over a series of water removal elements such as table rolls, foils, vacuum foils, and suction boxes. The stock is carried on the top surface of the papermaking fabric and is de-watered as the stock travels over the successive de-watering elements to form a sheet of paper. Finally, the wet sheet is transferred to the press section of the papermaking machine where enough water is removed to form a sheet of paper.

It is well known to continuously measure certain properties of the paper material in order to monitor the quality of the finished product. These on-line measurements often include basis weight, moisture content, and sheet caliper, i.e., thickness. The measurements can be used for controlling process variables with the goal of maintaining output quality and minimizing the quantity of product that must be rejected due to disturbances in the manufacturing process. The on-line sheet property measurements are often accomplished by scanning sensors that periodically traverse the sheet material from edge to edge. It is conventional to measure the basis weight and/or caliper of sheet material after it leaves the main dryer section or at the take-up reel with scanning sensors. The basis weight of the sheet material produced is an important property however current production methods only provide online measurement estimates.

SUMMARY OF THE INVENTION

The present invention is based, in part, on the development of a wireless technique of measuring the gross weight of the sheet material that is wound on the finished reel spool which generates real time weight readings to a control system. The actual weight measurements allow for fast dynamic correlations and verifications to the online estimate weight measurements. The operator can then adjust operating parameters of the various actuators and sensors in the papermaking process in response to measurement discrepancies.

In one aspect, the invention is directed to a sheet production system that includes:

- a sheet of material which moves in a machine direction (MD);
- one or more actuators that are configured to form a liquid-containing sheet of material;
- means for drying the liquid-containing sheet of material to form a sheet of dried material;
- means for calculating the basis weight of the sheet of dried material;
- means for reeling a traveling sheet of dried material that is produced to form a roll of material; and
- means for weighing the roll of material. Preferred devices for weighing the roll include load cells which refers to any type of sensor useful for measuring force, such as, for example, force sensors, force transducers, and the like.

In another aspect, the invention is directed to a method of operating a sheetmaking system that produces a continuous sheet that travels in the MD which includes:

(a) forming a sheet of material that contains a liquid;
(b) determining the basis weight of the sheet of material;
(c) reeling the traveling sheet of material into a roll;
(d) calculating the weight of the sheet material in the roll using basis weights determined in step (b) to yield an estimate weight; and
(e) weighing the roll to determine the actual weight of the sheet of material in the roll.

In a further aspect, the invention is directed to an apparatus for determining the gross weight of sheet material on a roll that includes:

- a spool that is equipped with a radio frequency identification (RFID) tag to identify its tare weight and/or its spool identification number wherein the spool is configured to wind the sheet of material;
- means for lifting a roll of material that is wound on the spool and comprises a sensor configured to sense a force produced by the roll of material when lifted and transmitting wireless signals that include information representative of the force produced by the roll of material; and
- means for calculating the gross weight of the sheet of material wound on the roll.

In one embodiment, the apparatus includes a pair of lifting devices each equipped with a load cell which is connected to a Wi-Fi signal transmitter or a Bluetooth signal transmitter.

While the invention will be illustrated as being implemented in papermaking, it is understood that the invention is applicable in other continuous sheet making processes such as, for example, in the manufacturer of rubber sheets, plastic films, lithium-ion battery electrodes, fabrics and the like.

DETAILED DESCRIPTION OF THE PREFERRED EMBODIMENTS

Figure 1:
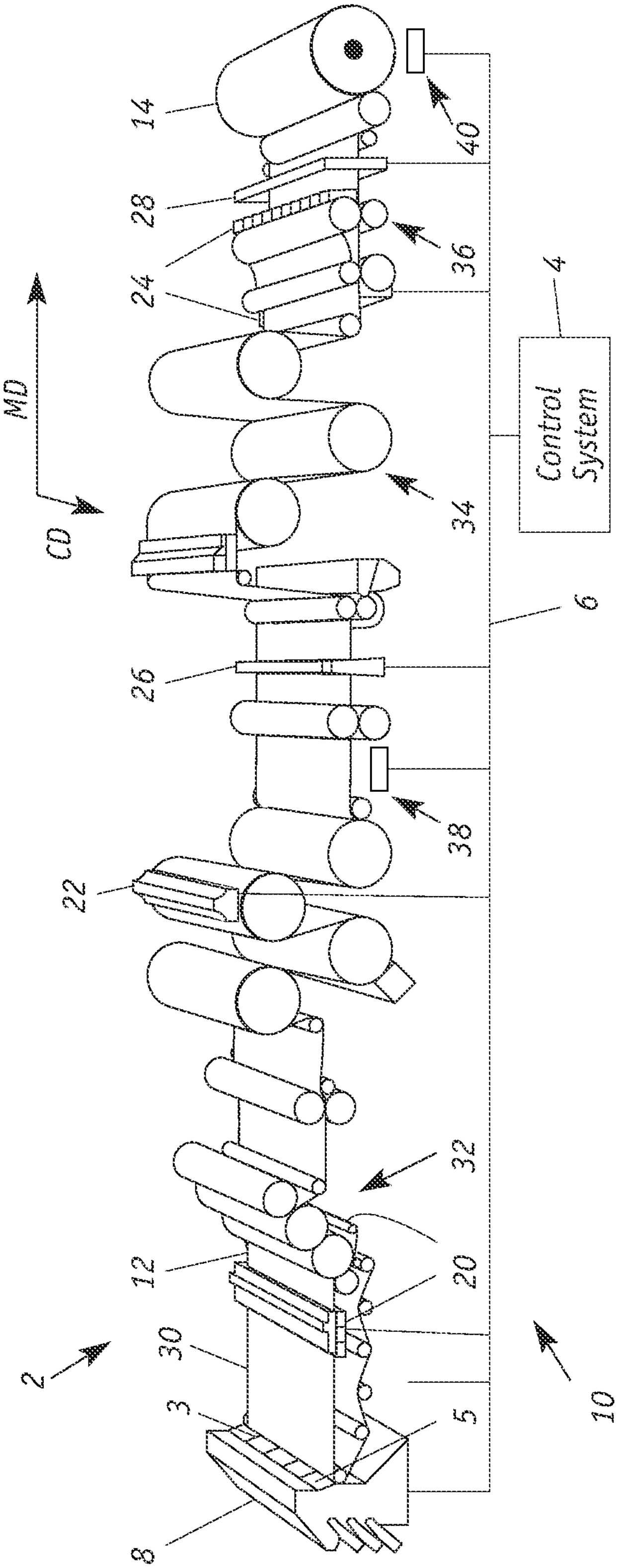
FIG. 1 is a schematic illustration of a papermaking system.

FIG. 1 illustrates a sheetmaking system 10 that includes papermaking machine 2, control system 4 and network 6. The papermaking machine 2 produces a continuous sheet of paper material 12, which can be more than 10 meters in width, that is collected in take-up reel 14. The paper material 12, having a specific width, is produced from a pulp suspension feedstock, comprising of an aqueous mixture of wood fibers and other materials, which undergoes various unit operations that are monitored and controlled by a quality control system 4. The network 6 facilitates communication between the components of system 10.

The papermaking machine 2 includes a headbox 8, which distributes an aqueous pulp suspension uniformly across the machine onto a continuous screen or wire 30 that is moving in the machine direction (MD). Headbox 8 includes slice openings through which the pulp suspension is distributed onto screen or wire 30 which comprise a suitable structure such as a mesh for receiving a pulp suspension and allowing water or other materials to drain or leave the pulp suspension. The formation of the paper sheet 12 is influenced by a plurality of linear actuators 3 extending in the cross direction across the sheet 12 of paper being formed. Actuators 3 control the sheet's weight in the cross direction (CD). Sensors located downstream from the actuators measure the properties of the sheet. The feedstock is fed from the head box through a gap or elongated orifice 5 onto a wire section 30. The orifice or gap is a relatively narrow opening that extends across the width of the machine. Weight profile control in such an arrangement is achieved by locally adjusting the position of the slice lip across the machine with motorized linear actuators 3 to vary the dimensions of the gap or orifice immediately adjacent the actuator. As used herein, the "wet end" forming portion of sheetmaking system 10 comprises headbox 8 and wire 30 and those sections before the wire 30, and the "dry end" comprises the sections that are downstream from wire 30.

Sheet 12 then enters a press section 32, which includes multiple press rolls where sheet 12 travels through the openings (referred to as "nips") between pairs of counter-rotating rolls in press section 32. In this way, the rolls in press section 32 compress the pulp material forming sheet 12. This may help to remove more water from the pulp material and to equalize the characteristics of the sheet 12 on both of its sides. A tachometer 38 measures the MD line speed.

As sheet 12 travels over a series of heated rolls in dryer section 34, more water in sheet 12 is evaporated. A calendar 36 processes and finishes sheet 12, for example, by smoothing and imparting a final finish, thickness, gloss, or other characteristic to sheet 12. Other materials (such as starch or wax) can also be added to sheet 12 to obtain the desired finish. An array of induction heating actuators 24 applies heat along the CD to one or more of the rollers to control the roll diameters and thereby the size of the nips. Once processing by calendar 36 is complete, sheet 12 is collected onto reel 14. A Wi-Fi or Bluetooth receiver is positioned in the vicinity of reel 14.

Sheetmaking system 10 further includes an array of steam actuators 20 that controls the amount of hot steam that is projected along the CD. The hot steam increases the paper surface temperature and allows for easier cross direction removal of water from the paper sheet. Also, to reduce or prevent over drying of the paper sheet, paper material 14 is sprayed with water in the CD. Similarly, an array of rewet shower actuators 22 controls the amount of water that is applied along the CD.

In order to control the papermaking process, selected properties of sheet 12 are continuously measured and the papermaking machine 2 adjusted to ensure sheet quality. Typical physical characteristics of paper that are can be measured include, for example, thickness, basis weight, moisture content, chemical composition such as ash, surface roughness, gloss, caliper, color, and crepe pattern surface features. CD control may be achieved by measuring sheet properties using one or more scanners 26, 28 that are capable of scanning sheet 12 and measuring one or more characteristics of sheet 12. For example, scanner 28 could carry sensors for measuring the dry weight, moisture content, ash content, or any other or additional characteristics of sheet 12. Scanner 28 includes suitable structures for measuring or detecting one or more characteristics of sheet 12, such as a set or array of sensors. Scanner 28 is particularly suited for measuring the dry end dry weight and caliper of the paper product at the take-up reel 14. Suitable caliper scanning sensors, are described in U.S. Pat. No. 6,967,726 to King et al. and U.S. Pat. No. 4,678,915 to Dahlquist et al., which are incorporated herein by reference.

Measurements from scanners 26 and 28 are provided to control system 4 that adjusts various actuators or operations of papermaking machine 2 that affect machine direction and cross direction characteristics of sheet 12. A machine direction characteristic of sheet 12 generally refers to an average characteristic of sheet 12 that varies and is controlled in the machine direction. In this example, control system 4 is capable of controlling the dry weight of the paper sheet by adjusting the supply of pulp to the headbox 8. For example, control system 4 could provide information to a stock flow controller that regulates the flow of stock through valves and to headbox 8. Control system 4 includes any hardware, software, firmware, or combination thereof for controlling the operation of the sheetmaking machine 2 or other machine. Control system 4 includes computer with a processor and memory storing instructions and data used, generated, and collected by the processor.

Figure 2:
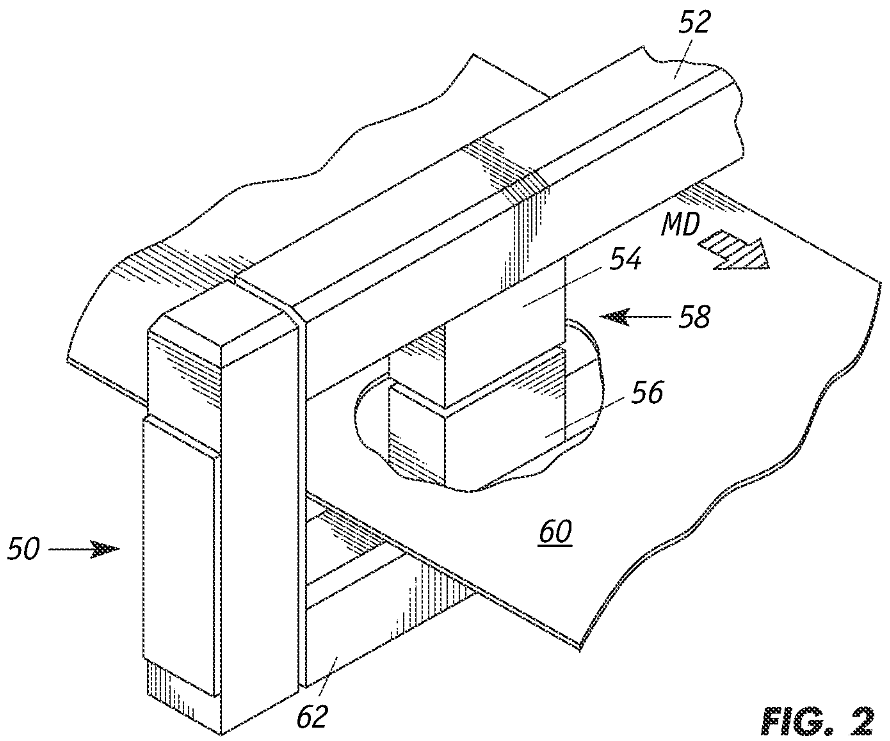
FIG. 2 is a scanning sensor.

FIG. 2 illustrates one particular implementation of the scanning sensor which is located at the dry end just before the take-up reel of FIG. 1. In particular, the radiation source and detector are housed in a dual mounting head scanner 58 of scanner system 50 which can be employed to measure one or more characteristics of the paper that is produced. Upper scanner head 54 moves repeatedly back and forth in the CD across the width of the moving sheet 60, which moves in the MD, so that the characteristics of the entire sheet may be measured. Scanner 58 or gauge is supported by two transverse beams 52 and 62 on which are mounted upper and lower scanning heads 54 and 56, respectively. The operative faces of the lower and upper scanner heads 56, 54 define a measurement gap or window that accommodates sheet 60. The lower scanner head 56 may include a sheet stabilization system such as an air-bearing stabilizer (not shown) to maintain the sheet on a consistent plane as it passes through the measurement window. The movement of the dual scanner heads 54, 56, is synchronized with respect to speed and direction so that they are aligned with each other. The scanners are also equipped with edge detectors (not shown) that measure sheet width.

Depending on the properties being monitored, the scanning sensors can be configured to operate in the transmissive mode or reflective mode. Basis weight scanning sensors are described, for example, in U.S. Pat. No. 10,935,368 to Tixier and U.S. 2015/0022220 to Tixier and Hughes, which are incorporated herein by reference. For instance, scanner head 54 can house a radiation source that directs a beam of radiation into a moving web or sheet 26 and scanner head 56 houses a radiation receiver that detects radiation that is transmitted through the material. As the dual scanner heads advances back and forth along the CD, the sensor measures one or more properties of the web or sheet 60. In the reflective mode, the upper scanner head 54 can house both a radiation source and detector to measure one or more characteristics of the web or sheet 26.

During paper production, the basis weight, caliper, sheet width and machine direction speed of the moving sheet of paper are continuously monitored. The accumulated data allows the weight of the paper that is wound onto a spool of a finished roll to be estimated.

Figure 3:
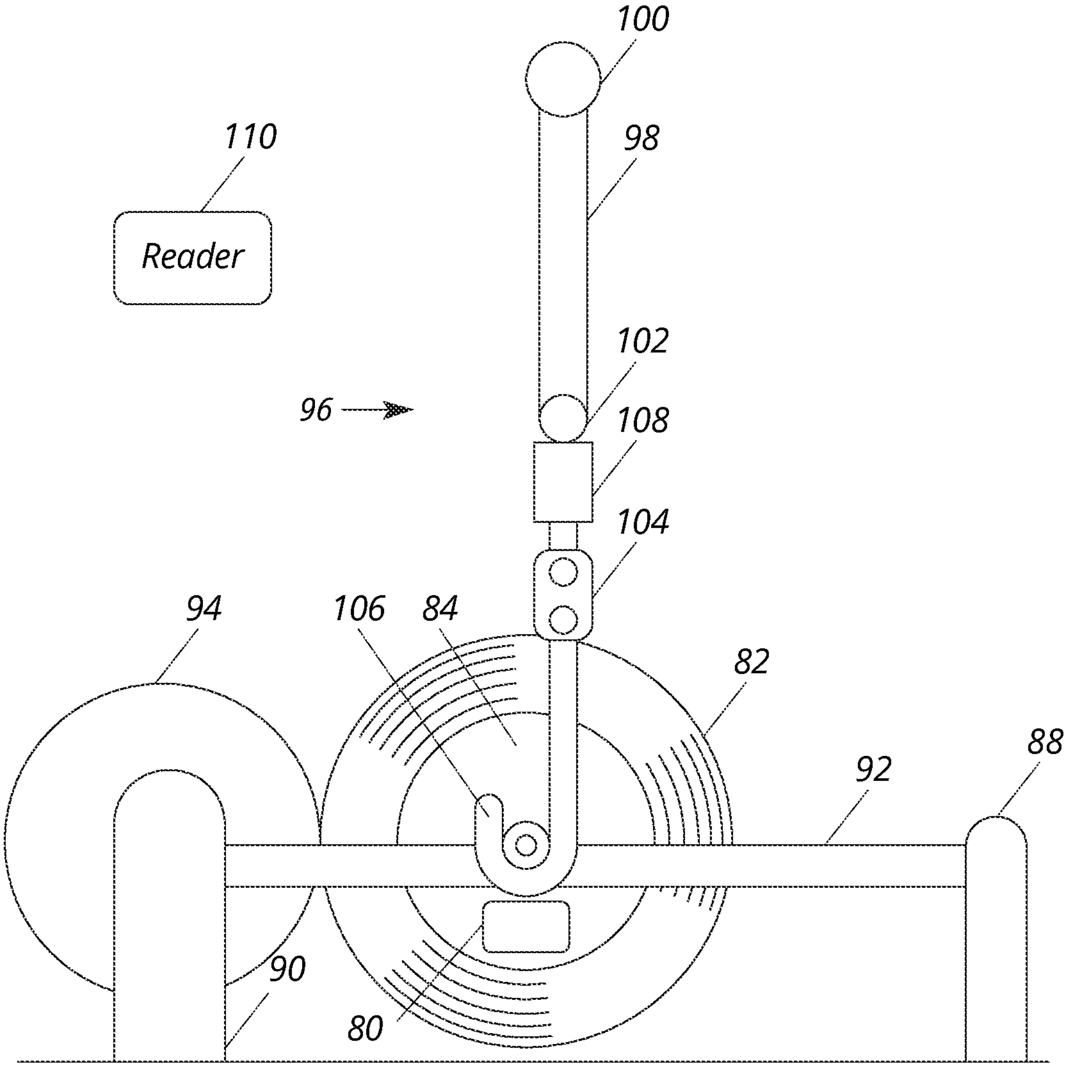
FIG. 3 is a side view of a lift mechanism for weighing a roll.

FIG. 3 shows a wound sheet or web roll 82, that has reached its desired diameter, and which is in contact with a support drum 94. A reel spool 84 includes a shaft 86 which rests on support rail 92 which is secured by posts 88, 90. It is understood that each of the two ends of the spool is supported by a support rail. The reel spool 84 can also have a bearing housing (not shown) on each end that is in contact with the support rails. An RFID tag 80, which is secured to the spool 84, has an assigned identification spool number and/or spool tare weight. The identification numbers of the plurality of spools used in the papermaking plant and their associated tare weights can be stored in the database of control system 4 (FIG. 1). In this fashion, once the identification number of a spool is known, its tare weight can be retrieved from the database.

The RFID tag can be either passive, active or battery assisted passive. Active tags have batteries and transmits signals intermittently. Battery assisted passive tags are activated when it is activated by an RFID reader. Passive tags do not have batteries and use the radio energy transmitted by the reader for its energy source. Passive tags include an integrate circuit that is coupled with a transponder antenna for receiving interrogation signals from a RFID reader antenna and for transmitting a transponder signal. In this example, the tags used are passive. Reading or scanning spool tag 80 reveals this spool's unique identification number which in turn allows retrieval of its tare weigh from the database. Alternatively, the tare weight can be stored into the tag 80 so that reading the tag will reveal the tare weight.

A lifting device 96 includes a cable 98 with a distal end 100, which is attachable to an overhead or bridge crane (not shown), and a proximal end which is secured to the top end of a strain gauge load cell 104 while a crane hook 106 is connected to its lower end. The load cell is operatively connected to a wireless transmitter 108.

The load cell 104 is capable of sensing the weight of the roll 82 and the transmitter sends wireless signals that includes information representative of the weight. In operation, a pair of lifting devices each with a weight sensor and associated wireless transmitter are employed to raise the roll 82. The two load cells in the pair of lifting devices are calibrated so that their combined readings indicate the weight of the roll. The transmitter devices can be configured to operate under any known wireless communication protocols such as, for example, Wi-Fi and Bluetooth. Weight signals from the pair of transmitter devices are received by wireless receiver 40 (FIG. 1).

The RFID reader 110 in FIG. 3 has an antenna that is capable of transmitting the interrogation signal and receiving the RFID transponder signals from the spool tag 80 that are responsive to the interrogation signal. The spool tag transponder signal includes its identification number and/or tare weight. The RFID reader 110 is operatively connected to control system 4 (FIG. 1) which processes the transponder signal from the spool RFID tag. In addition, the control system 4 receives weight signals from the pair of wireless transmitter devices. Based on this information, the computer in the control system calculates the actual gross weight of the sheet by subtracting the tare weight of the reel spool 84 from the weight of the roll 82. The computer also compares the actual gross weight to the estimated gross weight that was derived from the online measurements.

Figure 4:
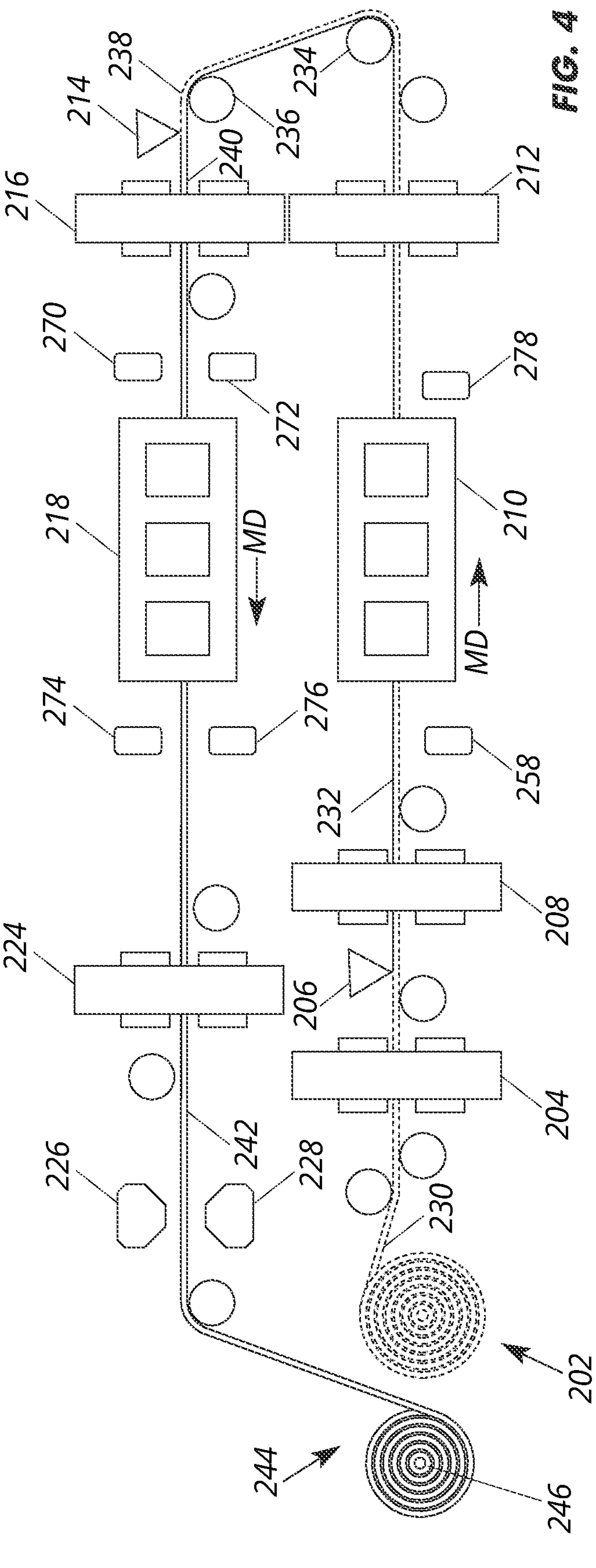
FIG. 4 is a schematic illustration of a lithium-ion battery electrode manufacturing system.

The present invention can be applied to other sheet making processes that produce liquid containing materials that are wound into a roll such as in the production of lithium-ion electrodes. FIG. 4 illustrates a process for coating a metal web or sheet that is used in fabricating electrodes for lithium-ion electrochemical cells and batteries. For making anodes, the electrode coating includes anodic active materials such as graphite and, for making cathodes, the electrode coating includes cathodic active materials such as a lithium metal oxide. Electrodes include a current collector metal foil that is coated on both sides of the foil with electrode slurry which can also include carbon black, binder, and solvent. After the electrode slurry is applied on a side of foil, the wet coated foil is heated in a dryer to extract the solvent to leave a solid layer of electrode material which adheres to the metal foil. Copper foil is a preferred anode current collector material and aluminum foil is a preferred cathode current collector material. As shown in FIG. 4, a roll 200 is unwound by an unwinder and supplies a continuous metal web or sheet 230 that is coated on a top surface with a layer of electrode slurry by a coater 206. The basis weight, thickness, and other characteristics of the metal web or sheet 230 from roll 200 are usually known; scanning beta gauges 204 and 208 are employed to measure, respectively, the basis weight and/or thickness before, and after, the electrode slurry is applied by the coater 206.

The coater 206, such as a tape casting coater, includes actuators that control a slot die/doctor blade to regulate the amount of slurry that is extruded onto the sheet 230. A dryer 210 removes excess solvents and cures the slurry that is on a moving coated sheet 232 to form an electrode layer on the sheet. Imaging devices 258 and 278 capture surface images of the coated sheet 232 before and after the dryer 210.

A scanning beta gauge 212 measures the basis weight and/or thickness of the moving coated sheet 232 exiting the dryer 210 after the calender 254. Thereafter, rolling supports 234, 236 reverse the orientation of a moving sheet 238 so that the uncoated side is on top whereupon a coater 214 applies a layer of electrode slurry on the top uncoated surface of a moving sheet 238. The basis weight and/or thickness of a double-side coated sheet 240 are then measured with a scanning beta gauge 16 before entering a dryer 218. Imaging devices 270, 272, 274 and 276 are strategically located to capture top and bottom surface images.

Further downstream, a beta gauge that is housed together with an infrared temperature sensor in a scanning device 224 measures the basis weight and/or thickness and the temperature of the double-coated sheet 242 as the scanning device 224 moves back and forth across the double-coated sheet 242. In particular the basis weight of each electrode layer is measured. A rewinder takes up the double-side coated sheet 242 into roll 244 which includes a reel spool 246 that is supported on rails (not shown). Surface defects on the top and bottom coatings are monitored by imaging devices 226, 228. The roll 244 is typically transferred to a calendering station whereby the double-coated electrode layer from the roll is unwound and passes through a calender which finishes and smooths the electrode layer.

Reel spool 246 includes an RFID tag which can transmit an identification number and/or its tare weight. Before undergoing the calendering process, a pair of the lifting devices shown in FIG. 3 are used to obtain the weigh of the roll 244. The gross weight of roll 244 is determined by subtracting the tare weight of the reel spool 246 from the roll weight.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An apparatus for controlling a sheet production system, wherein the apparatus comprises:

a spool equipped with a radio frequency identification (RFID) tag configured to identify a tare weight and/or a spool identification number of the spool, wherein the spool is configured to wind a sheet of material moving in a machine direction into a roll;

one or more lifting devices configured to lift the roll wound on the spool, wherein the one or more lifting devices comprise a sensor configured to sense a force produced by the roll when lifted and a wireless transmitter configured to transmit wireless signals that include information representative of the force produced by the roll;

one or more processors configured to calculate a gross weight of the sheet of material wound on the roll based at least on the sensed force and the tare weight of the spool identified by the RFID tag; and an actuator configured to adjust an amount of liquid applied to the sheet based on the calculated gross weight of the sheet of material wound on the roll.

2. The apparatus of claim 1, wherein the sensor is operatively connected to a Wi-Fi transmitter or Bluetooth transmitter.

3. The apparatus of claim 1, wherein the sensor comprises a load cell arranged to detect the force produced by the weight of the roll when lifted.

4. The apparatus of claim 1, wherein a tare weight for each spool of a plurality of spools associated with the sheet production system is stored in a database accessible by the one or more processors.

5. The apparatus of claim 1, wherein the sheet of material comprises paper or metal substrate coated with electrode material.

6. The apparatus of claim 1, wherein the one or more lifting devices comprise a pair of lifting devices, wherein each lifting device includes a load cell, and wherein the one or more processors are configured to combine and calibrate readings from the pair of lifting devices to determine the gross weight of the sheet of material wound on the roll.

7. The apparatus of claim 1, wherein the one or more processors are further configured to:

compare the calculated gross weight to an estimated gross weight;

determine a deviation between the calculated gross weight and the estimated gross weight;

on determining the deviation to exceed a threshold, control one or more actuators of the sheet production system based on the deviation.

8. The apparatus of claim 1, wherein calculating the gross weight of the sheet of material wound on the roll comprises subtracting the tare weight of the spool from a measured weight of the roll measured by the one or more lifting devices.

* * * * *